United States Patent
Xie et al.

(10) Patent No.: US 12,461,137 B2
(45) Date of Patent: Nov. 4, 2025

(54) SHIELDING-TYPE INSULATION DETECTION STRUCTURE

(71) Applicant: Delta Electronics (Shanghai) Co., Ltd., Shanghai (CN)

(72) Inventors: Yicong Xie, Shanghai (CN); Weiqiang Zhang, Shanghai (CN); Shuzhu Su, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 274 days.

(21) Appl. No.: 18/205,825

(22) Filed: Jun. 5, 2023

(65) Prior Publication Data

US 2024/0402236 A1    Dec. 5, 2024
US 2025/0264516 A9    Aug. 21, 2025

(51) Int. Cl.
*G01R 31/12*    (2020.01)
*G01R 31/52*    (2020.01)

(52) U.S. Cl.
CPC ......... *G01R 31/1272* (2013.01); *G01R 31/52* (2020.01)

(58) Field of Classification Search
CPC ... G01R 27/025; G01R 31/1272; G01R 31/52
See application file for complete search history.

(56) References Cited

U.S. PATENT DOCUMENTS

| 2016/0139181 A1 | 5/2016 | Gravermann et al. | |
| 2017/0363660 A1 | 12/2017 | Gravermann | |
| 2023/0290542 A1* | 9/2023 | Gundel | H01B 11/04 |

FOREIGN PATENT DOCUMENTS

| CN | 104076207 A | 10/2014 | |
| CN | 108535328 A | 9/2018 | |
| CN | 109561574 A * | 4/2019 | H05K 1/0268 |
| CN | 113295967 B | 3/2022 | |
| WO | 2014088562 A1 | 6/2014 | |
| WO | 2018092188 A1 | 5/2018 | |

OTHER PUBLICATIONS

Gnerlich, Hans R. et al., IEEE Guide for Fault-Locating Techniques on Shielded Power Cable Systems, IEEE, Nov. 16, 2007.
Luo, Bing et al., Interdigital Capacitive Sensor for Cable Insulation Defect Detection: Three-Dimensional MOdeling, Design, and Experimental Test, Hindawi-Journal of Sensors, Mar. 31, 2021.

* cited by examiner

*Primary Examiner* — Judy Nguyen
*Assistant Examiner* — Adam S Clarke
(74) *Attorney, Agent, or Firm* — KIRTON McCONKIE; Evan R. Witt

(57) ABSTRACT

A shielding-type insulation detection structure includes an input power source, a first shielding layer, a second shielding layer, a first impedance unit, a second impedance unit and a detection circuit. The first shielding layer is electrically connected with a first terminal of the input power source. The second shielding layer includes a first sub-layer and a second sub-layer. The insulation layer is disposed between the first shielding layer and the second shielding layer. The first impedance unit is electrically connected between the first sub-layer and a second terminal of the input power source. The second impedance unit is electrically connected between the second sub-layer and the second terminal of the input power source. The detection circuit is used to detect a detection signal related to a voltage difference between the first sub-layer and the second sub-layer of the second shielding layer.

16 Claims, 10 Drawing Sheets

SHIELDING-TYPE INSULATION DETECTION STRUCTURE

CROSS-REFERENCE TO RELATED APPLICATION

This application claims priority to China Patent Application No. 202211138625.5, filed on Sep. 19, 2022, the entire contents of which are incorporated herein by reference for all purposes.

FIELD OF THE INVENTION

The present disclosure relates to an insulation detection structure, and more particularly to a shielding-type insulation detection structure.

BACKGROUND OF THE INVENTION

With the evolution of the power distribution network to the smart power grid, power converters are developed toward modularization in order to meet the requirements of the smart power grid. For example, in solid-state transformers, modules are connected with each other in cascade and in parallel so as to adapt to the access of the high-voltage smart grid and the output of low voltage and high current.

In solid-state transformers, many positions need to be insulated. For example, the phase-to-phase insulation, the insulation between modules, the high and low voltage insulation between the primary and secondary sides in high-frequency transformers and the insulation between the medium voltage side of the auxiliary power supply and the low voltage side of the utility power supply are necessary.

When the compactness of assembly, the maintenance of high power density and the risk of dealing with air discharge under high voltage are taken into consideration, the above-mentioned insulated positions may be insulated in a shielding-type solid insulation manner. However, the power electronic circuits and the conductors containing both high-voltage power frequency components and high-frequency PWM square wave components are covered by the insulation structure. In other words, the insulation aging problem becomes more complicated. Therefore, it is important to monitor the performance of the insulated positions in order to avoid the breakdown risk caused by the insulation aging problem.

In order to monitor the performance of the insulated positions, a conventional insulation structure usually includes a detection circuit for receiving a single-loop sampling signal while detecting the high-frequency leakage current and the power frequency signal related to the insulation impedance. However, in the single-loop sampling signal, the high-frequency leakage current is much higher than the power frequency signal, so that the power frequency signal of the conventional insulation structure cannot be identified. Consequently, it is difficult for the conventional insulation structure to obtain the power frequency signal. Moreover, since the information about the insulation impedance cannot be acquired from the power frequency signal, the applicability of the conventional insulation structure is not satisfied.

In order to avoid the interference of the high-frequency leakage current of the module, some other conventional insulation structure uses specific control methods. For example, when the high-frequency power element of a solid-state transformer is not switched (e.g., in a light load status, a standby status or a sleep status), the detection circuit is enabled to perform the insulation detection. However, this method is neither convenient nor cost-effective.

Therefore, there is a need of providing a shielding-type insulation detection structure in order to overcome the drawbacks of the conventional technologies.

SUMMARY OF THE INVENTION

The present disclosure provides a shielding-type insulation detection structure. The second shielding layer is divided into two sub-layers, i.e., the first sub-layer and the second sub-layer. Consequently, the shielding-type insulation detection structure includes two branch circuits, and the two branch circuits are collaboratively formed as a bridge-type differential circuit. The detection circuit is used to obtain a detection signal that is related to the voltage difference between the first sub-layer and the second sub-layer of the second shielding layer. By the bridge-type differential circuit, the capability of suppressing the high-frequency noise is enhanced. Consequently, the power frequency voltage signal related to the insulation impedance can be effectively acquired. In other words, the applications of the shielding-type insulation detection structure of the present disclosure are expanded. Moreover, since it is not necessary to use an additional control mechanism to perform the insulation detection, the shielding-type insulation detection structure of the present disclosure is more convenient and cost-effective.

In accordance with an aspect of present disclosure, a shielding-type insulation detection structure is provided. The shielding-type insulation detection structure includes an input power source, a first shielding layer, a second shielding layer, an insulation layer, a first impedance unit, a second impedance unit and a detection circuit. The input power source includes a first terminal and a second terminal. The first shielding layer is electrically connected with the first terminal of the input power source. The second shielding layer includes a first sub-layer and a second sub-layer. The first sub-layer and the second sub-layer are separated from each other. The insulation layer is disposed between the first shielding layer and the second shielding layer. The first impedance unit is electrically connected between the first sub-layer of the second shielding layer and the second terminal of the input power source. The second impedance unit is electrically connected between the second sub-layer of the second shielding layer and the second terminal of the input power source. The detection circuit is electrically connected with the first sub-layer and the second sub-layer. A detection signal related to a voltage difference between the first sub-layer and the second sub-layer of the second shielding layer is detected by the detection circuit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
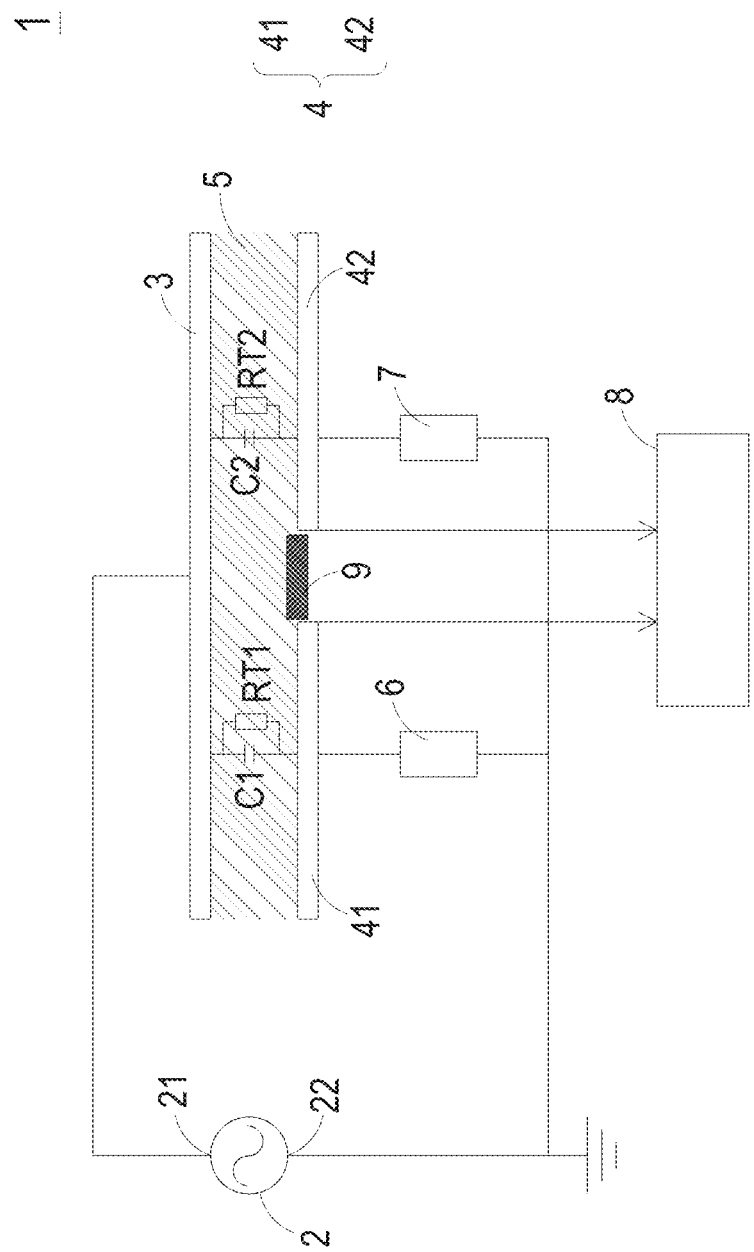
FIG. 1A schematically illustrates a shielding-type insulation detection structure according to a first embodiment of the present disclosure.
Figure 1B:
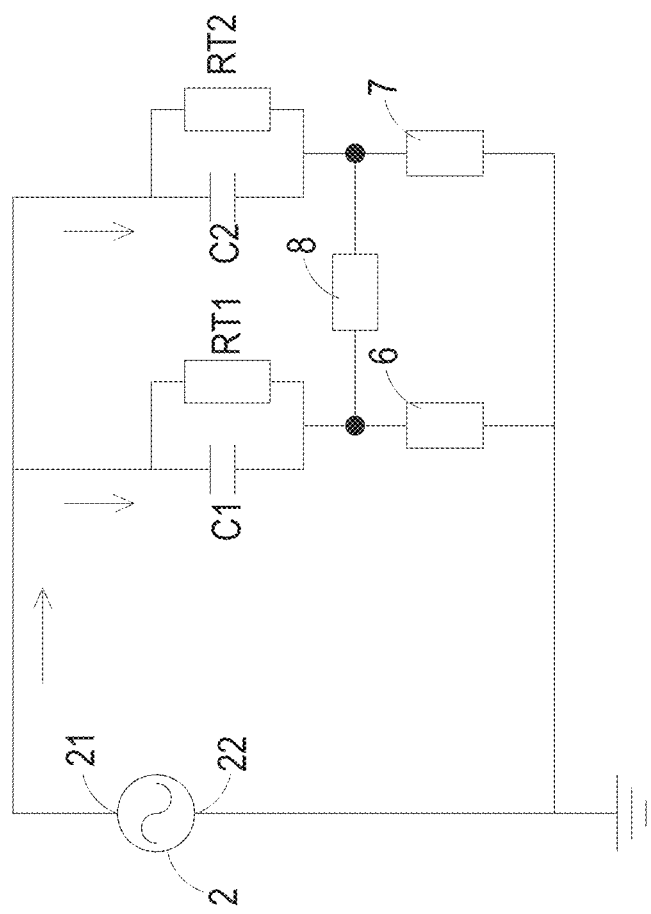
FIG. 1B is a schematic circuit diagram illustrating the equivalent circuit of the shielding-type insulation detection structure as shown in FIG. 1A.

Please refer to FIGS. 1A and 1B. FIG. 1A schematically illustrates a shielding-type insulation detection structure according to a first embodiment of the present disclosure. FIG. 1B is a schematic circuit diagram illustrating the equivalent circuit of the shielding-type insulation detection structure as shown in FIG. 1A. In this embodiment, the shielding-type insulation detection structure 1 is disposed on a module or a power distribution device (not shown). The shielding-type insulation detection structure 1 includes an input power source 2, a first shielding layer 3, a second shielding layer 4, an insulation layer 5, a first impedance unit 6, a second impedance unit 7 and a detection circuit 8.

Figure 8:
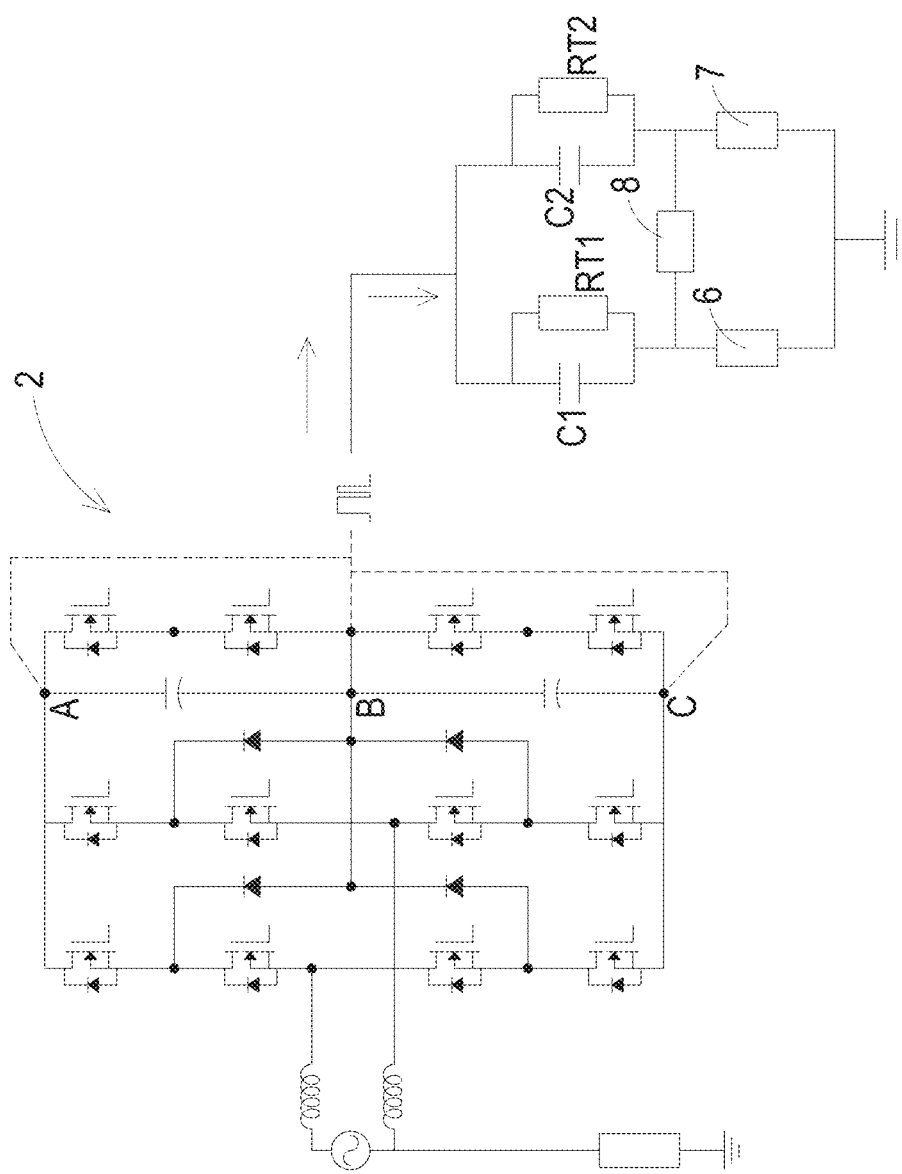
FIG. 8 is a schematic circuit diagram illustrating an example of an input power source for the shielding-type insulation detection structure as shown in FIG. 1.
Figure 9:
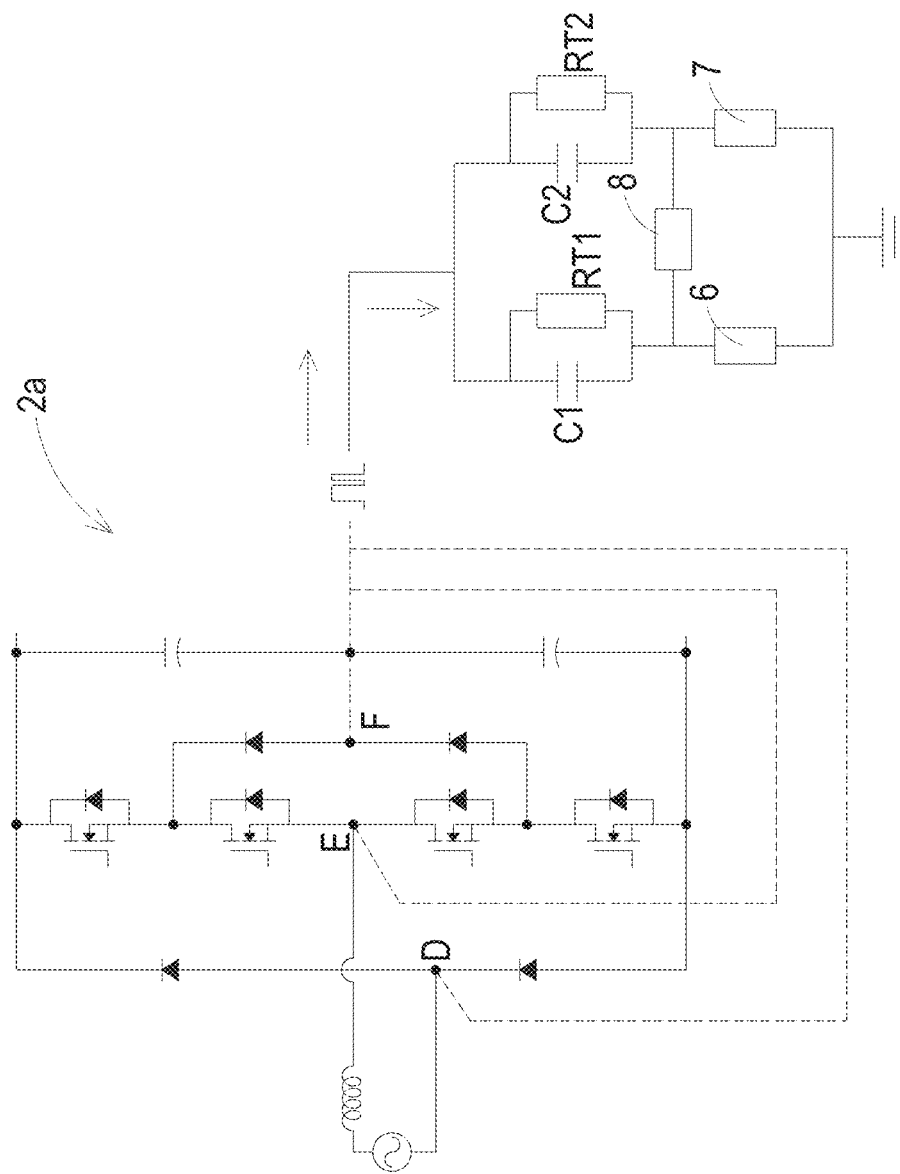
FIG. 9 is a schematic circuit diagram illustrating another example of an input power source for the shielding-type insulation detection structure as shown in FIG. 1.

In one embodiment, the input power source 2 is an external power grid or an input power source located in the module. Moreover, the input source signal is a DC voltage, a power frequency AC voltage on the grid side, or an AC voltage at an internal node of the converter. In case that waveform of the voltage at the internal node of the converter relative to the ground terminal contains an AC component, the internal node of the converter can be used as the input power source 2. Some examples of the input power source 2 will be described later. For example, each of the node A, the node B and the node C shown in FIG. 8 can be used as the input power source 2. In addition, each of the node D, the node E and the node F shown in FIG. 9 can be used as the input power source 2a.

Please refer to FIG. 1A. The input power source 2 includes a first terminal 21 and a second terminal 22. The second terminal 22 of the input power source 2 is close to the ground terminal. The first terminal 21 of the input power source 2 is away from the ground terminal. The input power source 2 provides output power through the first terminal 21. The second terminal of the input power source 2 is connected with the ground terminal.

The first shielding layer 3 is made of a conductive material. The first shielding layer 3 is connected with the first terminal 21 of the input power source 2, so that the first shielding layer 3 constitutes a high-voltage side of the shielding-type insulation detection structure 1.

The second shielding layer 4 is made of a conductive material. The second shielding layer 4 includes a first sub-layer 41 and a second sub-layer 42. The first sub-layer 41 and the second sub-layer 42 are separated from each other. That is, the first sub-layer 41 and the second sub-layer 42 are not in direct contact with each other.

The insulation layer 5 is made of an insulating material. In addition, the insulation layer 5 is disposed between the first shielding layer 3 and the second shielding layer 4. In some embodiments, the first shielding layer 3 and the second shielding layer 4 are opposed to each other with respect to the insulation layer 5.

The first impedance unit 6 is a resistor, a serially-connected structure of a resistor and an inductor, a parallel-connected structure of a resistor and an inductor, a serially-connected structure of a resistor and a capacitor, or a parallel-connected structure of a resistor and a capacitor. The first impedance unit 6 is electrically connected between the first sub-layer 41 of the second shielding layer 4 and the second terminal 22 of the input power source 2.

The second impedance unit 7 is a resistor, a serially-connected structure of a resistor and an inductor, a parallel-connected structure of a resistor and an inductor, a serially-connected structure of a resistor and a capacitor, or a parallel-connected structure of a resistor and a capacitor. The second impedance unit 7 is electrically connected between the second sub-layer 42 of the second shielding layer 4 and the second terminal 22 of the input power source 2.

Please refer to FIG. 1A again. The first sub-layer 41 of the second shielding layer 4 is electrically connected with the second terminal 22 of the input power source 2 through the first impedance unit 6. In addition, the second sub-layer 42 of the second shielding layer 4 is electrically connected with the second terminal 22 of the input power source 2 through the second impedance unit 7. Consequently, the second shielding layer 4 constitutes a low-voltage side of the shielding-type insulation detection structure 1.

As mentioned above, the second shielding layer 4 includes the first sub-layer 41 and the second sub-layer 42. The portion of the insulation layer 5 between the first shielding layer 3 and the first sub-layer 41 of the second shielding layer 4 is equivalent to a parallel-connected circuit structure of a first equivalent capacitor C1 and a first equivalent resistor RT1. The impedance value of the parallel-connected circuit structure of the first equivalent capacitor C1 and the first equivalent resistor RT1 is related to the power frequency voltage signal. Similarly, the portion of the insulation layer 5 between the first shielding layer 3 and the second sub-layer 42 of the second shielding layer 4 is equivalent to a parallel-connected circuit structure of a second equivalent capacitor C2 and a second equivalent resistor RT2. The impedance value of the parallel-connected circuit structure of the second equivalent capacitor C2 and the second equivalent resistor RT2 is related to the power frequency voltage signal.

The equivalent circuit of the shielding-type insulation detection structure 1 will be described as follows. Please refer to FIG. 1B. The shielding-type insulation detection structure 1 includes a first branch circuit and a second branch circuit, which are collaboratively formed as a bridge-type differential circuit.

The first branch circuit includes the first equivalent capacitor C1, the first equivalent resistor RT1 and the first impedance unit 6. The first equivalent capacitor C1 and the first equivalent resistor RT1 are connected in parallel and collaboratively formed as a first parallel-connected circuit structure. Moreover, the first parallel-connected circuit structure and the first impedance unit 6 are connected in series. The second branch circuit includes the second equivalent capacitor C2, the second equivalent resistor RT2 and the second impedance unit 7. The second equivalent capacitor C2 and the second equivalent resistor RT2 are connected in parallel and collaboratively formed as a second parallel-connected circuit structure. Moreover, the second parallel-connected circuit structure and the second impedance unit 7 are connected in series. The first branch circuit and the second branch circuit are collaboratively formed as a bridge-type differential circuit. By the bridge-type differential circuit, the capability of suppressing the high-frequency noise is enhanced. Consequently, the power frequency voltage signal related to the insulation impedance can be effectively acquired.

The first parallel-connected circuit structure of the first equivalent capacitor C1 and the first equivalent resistor RT1 has a first parallel-connected impedance value. The second parallel-connected circuit structure of the second equivalent capacitor C2 and the second equivalent resistor RT2 has a second parallel-connected impedance value. The ratio of the first parallel-connected impedance value to the impedance value of the first impedance unit 6 and the ratio of the second parallel-connected impedance value to the impedance value of the second impedance unit 7 are equal. In case that the insulating material is normal, the bridge-type differential circuit defined by the first branch circuit and the second branch circuit is balanced. Whereas, in case that the insulating material is abnormal, the first parallel-connected impedance value and/or the second parallel-connected impedance value will be subjected to a change. Under this circumstance, the bridge-type differential circuit is out of balance. Consequently, the magnitude of the power frequency voltage signal is correspondingly changed.

Please refer to FIG. 1A again. The detection circuit 8 is electrically connected with the first sub-layer 41 and the second sub-layer 42 of the second shielding layer 4 in order to obtain a detection signal that is related to the voltage difference between the first sub-layer 41 and the second sub-layer 42 of the second shielding layer 4. For example, the detection signal is a voltage signal, a current signal, or any other appropriate electric signal. Alternatively, the detection signal related to the voltage difference between the first sub-layer 41 and the second sub-layer 42 of the second shielding layer 4 includes a liquid crystal deflection signal or an electrochemical color development signal. The type of the detection signal is not restricted as long as the detection signal is highly related to the voltage difference between the first sub-layer 41 and the second sub-layer 42. In case that the performance of the insulation layer 5 is changed (e.g., malfunction or performance reduction), the first parallel-connected impedance value and/or the second parallel-connected impedance value will be subjected to a change. Under this circumstance, the bridge-type differential circuit is out of balance, and the magnitude of the power frequency voltage signal is correspondingly changed. At the same time, the voltage difference between the first sub-layer 41 and the second sub-layer 42 is also changed. According to the detection signal related to the voltage difference between the first sub-layer 41 and the second sub-layer 42, the detection circuit 8 can determine whether the insulation layer 5 of the shielding-type insulation detection structure 1 is subjected to malfunction or performance reduction.

Figure 2:
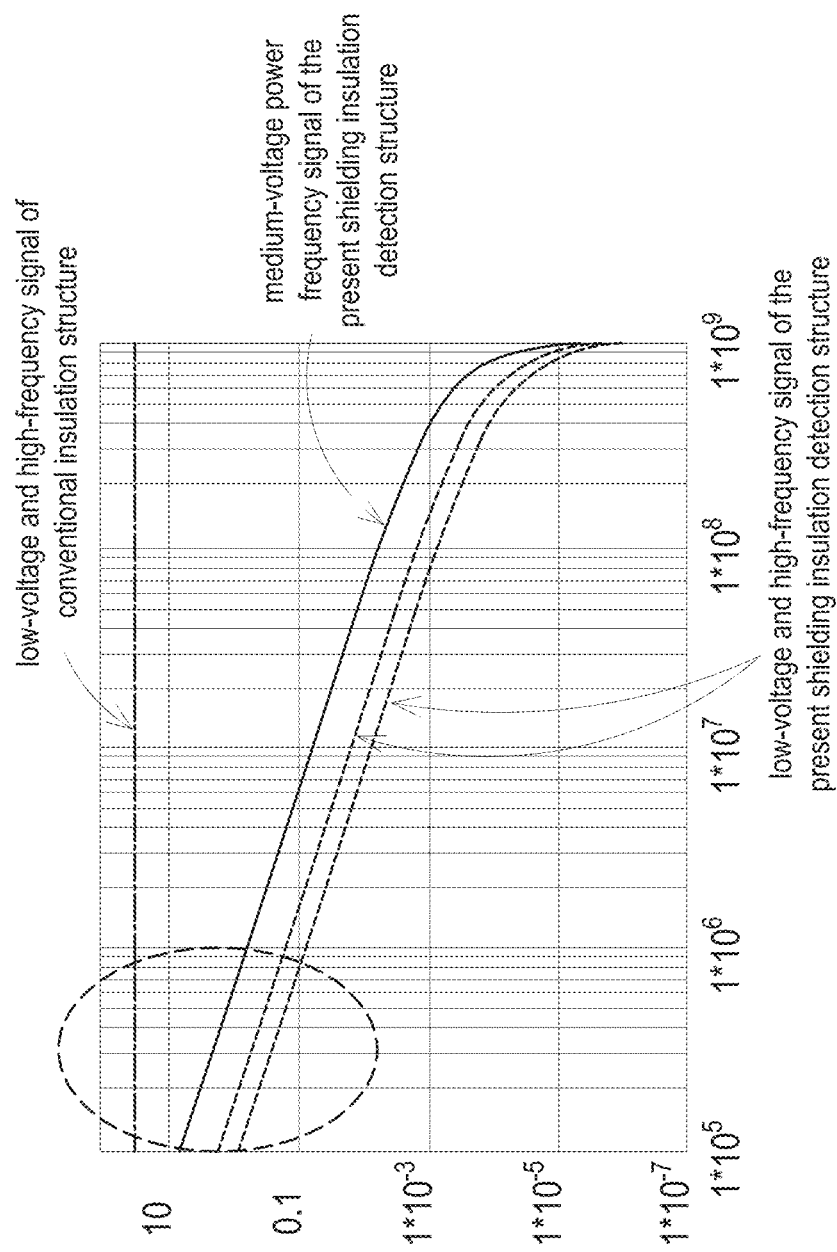
FIG. 2 is a plot illustrating the relationship between the signal intensity and the equivalent resistor for the conventional insulation structure and the present shielding-type insulation detection structure when the insulation layer is normal.
Figure 3:
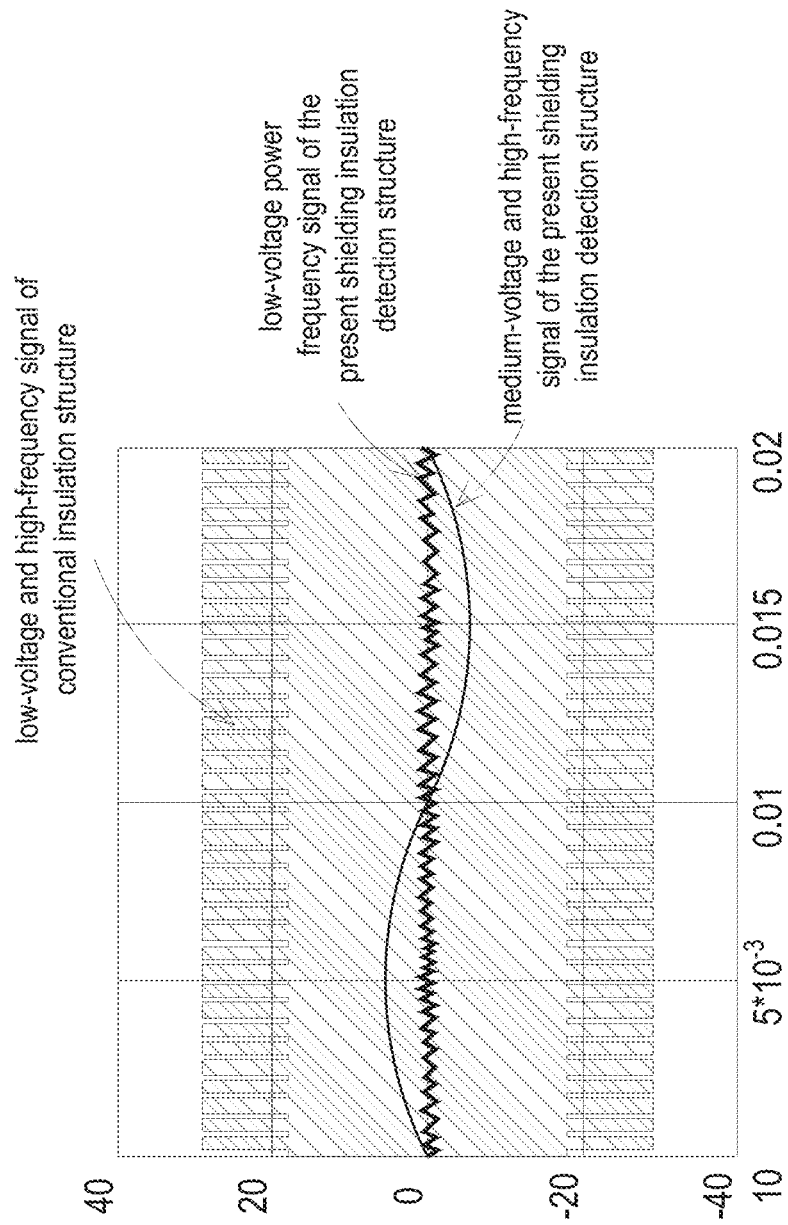
FIG. 3 is a plot illustrating the relationship between the signal intensity for the conventional insulation structure and the present shielding-type insulation detection structure when the insulation layer malfunctions.

Please refer to FIGS. 1A, 1B, 2 and 3. FIG. 2 is a plot illustrating the relationship between the signal intensity and the equivalent resistor for the conventional insulation structure and the present shielding-type insulation detection structure when the insulation layer is normal. FIG. 3 is a plot illustrating the relationship between the signal intensity for the conventional insulation structure and the present shielding-type insulation detection structure when the insulation layer malfunctions. In the identical working condition, the intensity of the high-frequency signal of the conventional insulation structure is much greater than the intensity of the power frequency signal. Consequently, the power frequency signal of the conventional insulation structure cannot be identified. For example, in FIGS. 2 and 3, only high-frequency signal of conventional insulation structure is identified. In the identical working condition of the present shielding-type insulation detection structure 1, the intensity of high-frequency signal is lower than the intensity of the power frequency signal. Consequently, both of the high-frequency signal and the power frequency signal of the present shielding-type insulation detection structure 1 can be identified. In other words, the shielding-type insulation detection structure 1 of the present disclosure can greatly suppress the influence of high-frequency signal on the power frequency signal. Consequently, the signal-to-noise ratio of power frequency signal is increased, and the performance of the insulation layer 5 can be recognized according to the detection signal related to the voltage difference between the first sub-layer 41 and the second sub-layer 42 of the second shielding layer 4.

As mentioned above, the second shielding layer 4 of the shielding-type insulation detection structure 1 is divided into two sub-layers, i.e., the first sub-layer 41 and the second sub-layer 42. The circuitry topology of the shielding-type insulation detection structure 1 includes two branch circuits. The detection circuit 8 is used to obtain the detection signal that is related to the voltage difference between the first sub-layer 41 and the second sub-layer 42 of the second shielding layer 4. In this embodiment, the shielding-type insulation detection structure 1 performs the insulation detection according to the voltage difference between the two branch circuits. In other words, the two branch circuits of the shielding-type insulation detection structure 1 are collaboratively formed as the bridge-type differential circuit for performing the insulation detection. When compared with the conventional insulation structure of using the single-loop sampling signal to perform the insulation detection, the capability of suppressing the high-frequency noise by using the shielding-type insulation detection structure 1 of the present disclosure is enhanced. Consequently, the power frequency voltage signal related to the insulation impedance can be effectively acquired, and the performance of the insulation layer 5 can be confirmed. In other words, the applications of the shielding-type insulation detection structure 1 of the present disclosure are expanded. Moreover, since it is not necessary to use an additional control mechanism to perform the insulation detection, the shielding-type insulation detection structure 1 of the present disclosure is more convenient and cost-effective.

As mentioned above, the first equivalent capacitor C1 and the first equivalent resistor RT1 are connected in parallel, and the second equivalent capacitor C2 and the second equivalent capacitor RT2 are connected in parallel. If the input power from the input power source 2 contains an AC signal and the first equivalent resistor RT1 is bypassed by the first equivalent capacitor C1 (an/or the second equivalent capacitor RT2 is bypassed by the second equivalent capacitor C2), the detection signal that is related to the voltage difference between the first sub-layer 41 and the second sub-layer 42 cannot be obtained. For solving the above problems, the shielding-type insulation detection structure 1 needs to comply with the following formulae (1) and (2):

$$\left|\frac{1}{2\pi f \times C1}\right| \ge RT1 \quad (1)$$

$$\left|\frac{1}{2\pi f \times C2}\right| \ge RT2 \quad (2)$$

In the above formulae, f is the frequency of the AC signal of the input power source 2, C1 is the capacitance value of the first equivalent capacitor, RT1 is the resistance value of the first equivalent resistor, C2 is the capacitance value of the second equivalent capacitor, and RT2 is the resistance value of the second equivalent capacitor.

In some embodiments, the shielding-type insulation detection structure 1 needs to comply with the following formulae (3) and (4):

$$\left|\frac{1}{2\pi f \times C1}\right| \gg RT1 \quad (3)$$

$$\left|\frac{1}{2\pi f \times C2}\right| \gg RT2 \quad (4)$$

In some embodiments, as shown in FIG. 1A, the shielding-type insulation detection structure 1 further includes an isolation impedance 9. The isolation impedance 9 is disposed between the first sub-layer 41 and the second sub-layer 42. In this embodiment, there is a vacant space between the isolation impedance 9, the first sub-layer 41 and the second sub-layer 42. The isolation impedance 9 is an insulator, a high-resistance value element, a semi-conductor or a low-resistance value element that is formed between the first sub-layer 41 and the second sub-layer 42 through a coating process, a sticking process, a spraying process, an electroplating process or an etching process.

Figure 4:
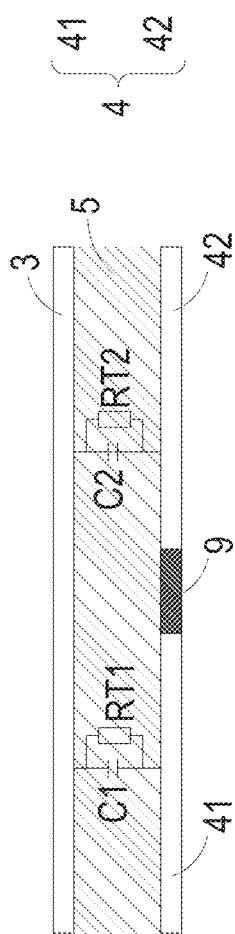
FIG. 4 schematically illustrates a portion of a shielding-type insulation detection structure according to a second embodiment of the present disclosure.

In some other embodiments, there is not a vacant space between the isolation impedance 9 and the first sub-layer 41, and between the isolation impedance 9 and the second sub-layer 42. FIG. 4 schematically illustrates a portion of a shielding-type insulation detection structure according to a second embodiment of the present disclosure. In this embodiment, the isolation impedance 9 is disposed between the insulation layer 5, the first sub-layer 41 and the second sub-layer 42. Moreover, the first sub-layer 41 and the second sub-layer 42 are continuous through the isolation impedance 9. Consequently, the first sub-layer 41 and the second sub-layer 42 can maintain continuous shielding, so as to avoid the surface electric field concentration and reduce the risk of partial discharge when the shielding-type insulation detection structure is used in a high-voltage situation.

Figure 5:
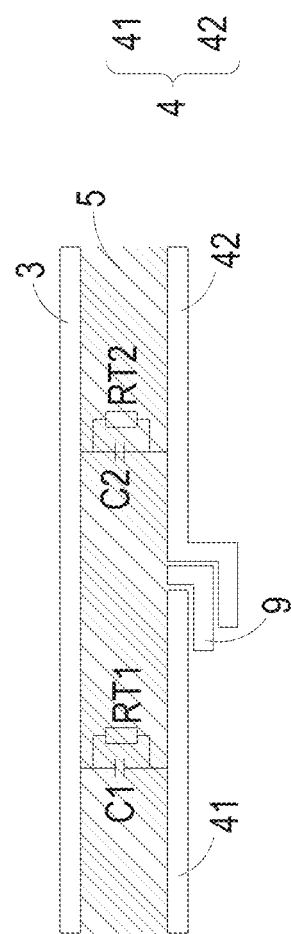
FIG. 5 schematically illustrates a portion of the shielding-type insulation detection structure according to a third embodiment of the present disclosure.

FIG. 5 schematically illustrates a portion of the shielding-type insulation detection structure according to a third embodiment of the present disclosure. In this embodiment, the second sub-layer 42 of the second shielding layer 4 includes a bent extension part 420. A portion of the first sub-layer 41 is sheltered by the bent extension part 420. In other words, a portion of the first sub-layer 41 is sheltered by a portion of the second sub-layer 42, so that the portion of the second sub-layer 42 and the portion of the first sub-layer 41 are overlapped. Moreover, at least a portion of the isolation impedance 9 is disposed between the bent extension part 420 of the second sub-layer 42 and the first sub-layer 41. In other word, at least a portion of the isolation impedance 9 is overlapped with the portion of the second sub-layer 42 and the portion of the first sub-layer 41. Since the first sub-layer 41 and the second sub-layer 42 are partially overlapped, the projection area of the first sub-layer 41 with respect to the insulation layer 5 and the projection area of the second sub-layer 42 with respect to the insulation layer 5 are continuous. Under this circumstance, the outer surface of the first sub-layer 41 and the outer surface of the second sub-layer 42 are continuous through the isolation impedance 9. Consequently, when the shielding-type insulation detection structure is used in a high-voltage situation, the surface electric field will not be concentrated, and the risk of partial discharge will be reduced.

Figure 6A:
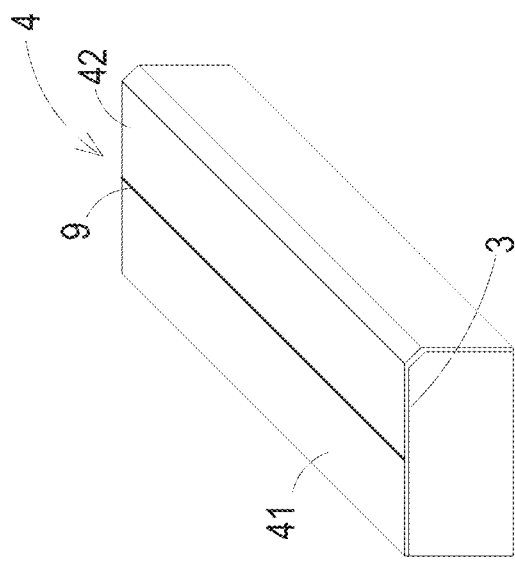
FIGS. 6A, 6B, 6C and 6D are schematic perspective views illustrating some examples of the first sub-layer and the second sub-layer in the second shielding layer of the shielding-type insulation detection structure.
Figure 6B:
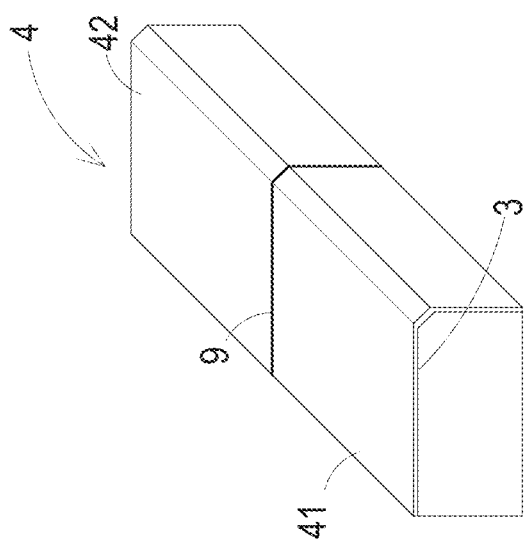
Figure 6C:
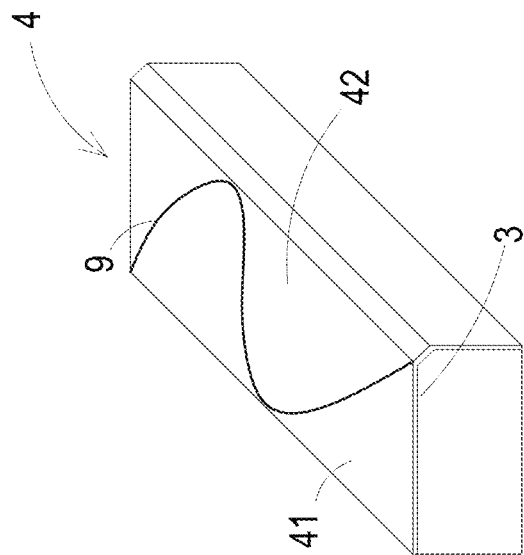
Figure 6D:
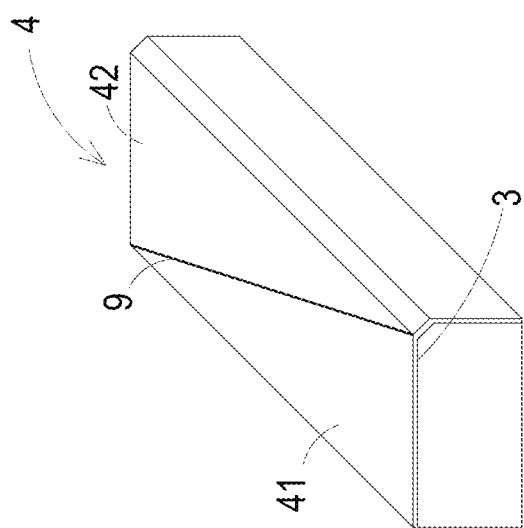

FIGS. 6A, 6B, 6C and 6D are schematic perspective views illustrating some examples of the first sub-layer and the second sub-layer in the second shielding layer of the shielding-type insulation detection structure. In order to balance the voltage between the first branch circuit and the second branch circuit, it is preferred that the capacitance value of the first equivalent capacitor C1 is equal to the capacitance value of the second equivalent capacitor C2. For achieving this purpose, the surface area of the first sub-layer 41 and the surface area of the second sub-layer 42 are equal. As shown in FIG. 6A, the first shielding layer 3, the second shielding layer 4 and the insulation layer 5 are stacked as a three-layered structure and formed as a casing. The first shielding layer 3 is located at the inner side of the three-layered structure. The second shielding layer 4 is located at the outer side of the three-layered structure. The surface area of the first sub-layer 41 and the surface area of the second sub-layer 42 are equal. Consequently, the capacitance value of the first equivalent capacitor C1 and the capacitance value of the second equivalent capacitor C2 are equal. It is noted that the shapes of the first sub-layer 41 and the second sub-layer 42 are not restricted. For example, the shapes of the first sub-layers 41 and the second sub-layers 42 in FIGS. 6A, 6B, 6C and 6D are different. The locations of the first sub-layer 41, the second sub-layer 42 and the isolation impedance 9 may be varied according to the practical requirements. In some other embodiments, the first shielding layer 3, the second shielding layer 4 and the insulation layer 5 are stacked as another structure such as a flat plate structure (e.g., a ceramic substrate or a printed circuit board) or a tubular structure (e.g., an insulation sleeve or a solid-sealed pole).

Figure 7:
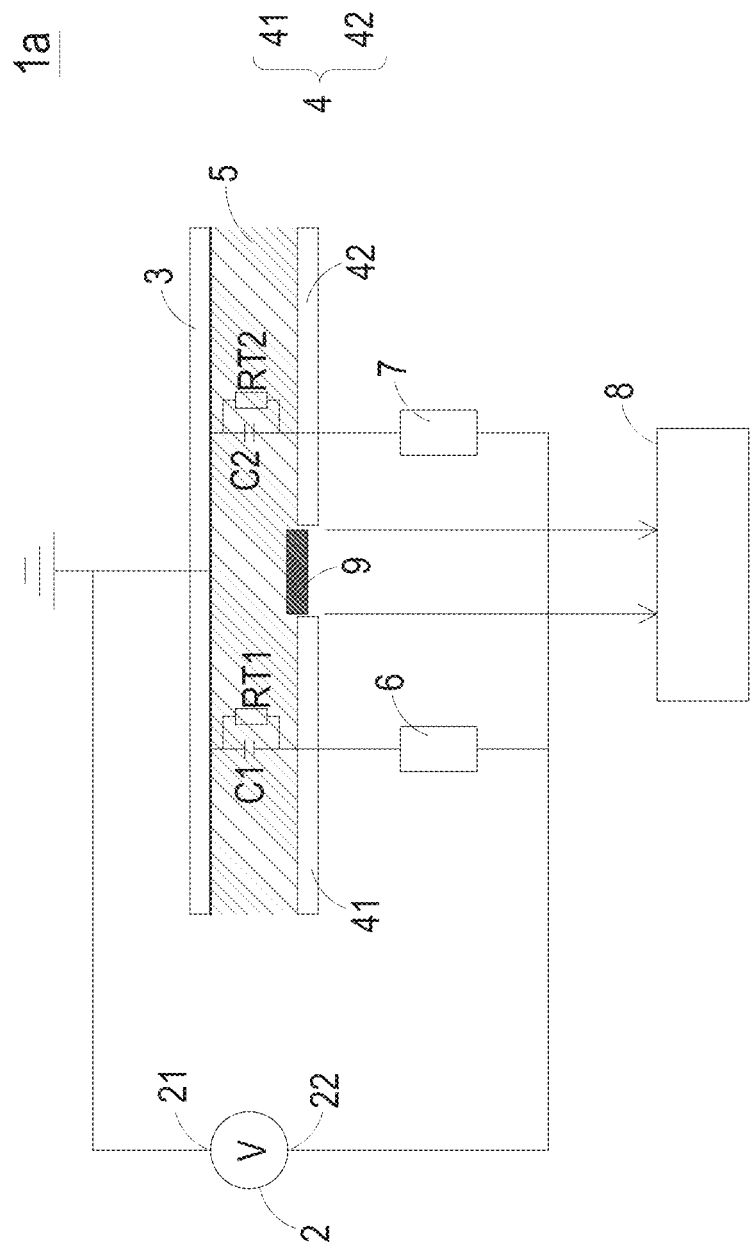
FIG. 7 schematically illustrates a portion of the shielding-type insulation detection structure according to a fourth embodiment of the present disclosure.

FIG. 7 schematically illustrates a portion of the shielding-type insulation detection structure according to a fourth embodiment of the present disclosure. In this embodiment, the first terminal 21 of the input power source 2 is close to the ground terminal, and the second terminal 21 of the input power source 2 is away from the ground terminal. The input power source 2 provides output power through the second terminal 22. The first second terminal 21 of the input power source 2 is connected with the ground terminal. The first shielding layer 3 is connected with the first terminal 21 of the input power source 2. Consequently, the first shielding layer 3 constitutes a low-voltage side. The first sub-layer 41 of the second shielding layer 4 is electrically connected with the second terminal 22 of the input power source 2 through the first impedance unit 6. The second sub-layer 42 of the second shielding layer 4 is electrically connected with the second terminal 22 of the input power source 2 through the second impedance unit 7. Consequently, the second shielding layer 4 constitutes a high-voltage side.

In the above embodiment, the second shielding layer 4 includes the first sub-layer 41 and the second sub-layer 42. In some other embodiments, the second shielding layer 4 further includes 2N additional sub-layers (not shown), wherein N is a positive integer. The first sub-layer 41, the second sub-layer 42 and the 2N additional sub-layers are all contacted with the insulation layer 5. Moreover, the first sub-layer 41, the second sub-layer 42 and the 2N additional sub-layers are all discretely arranged. In one embodiment, the first sub-layer 41, the second sub-layer 42 and the 2N additional sub-layers are arranged in the direction parallel with the first shielding layer 3. Furthermore, the shielding-type insulation detection structure further includes additional 2N impedance units corresponding to the 2N additional sub-layers. Each of the 2N additional impedance units is electrically connected between the corresponding one of the 2N additional sub-layers and the second terminal 22 of the input power source 2. Moreover, each sub-layer and the corresponding impedance unit are collaboratively formed as a branch circuit. Consequently, the shielding-type insulation detection structure includes (2+2N) branch circuits.

From the above descriptions, the present disclosure provides the shielding-type insulation detection structure. The second shielding layer is divided into two sub-layers, i.e., the first sub-layer and the second sub-layer. Consequently, the shielding-type insulation detection structure includes two branch circuits, and the two branch circuits are collaboratively formed as a bridge-type differential circuit. The detection circuit is used to obtain a detection signal that is related to the voltage difference between the first sub-layer and the second sub-layer of the second shielding layer. By the bridge-type differential circuit, the capability of suppressing the high-frequency noise is enhanced. Consequently, the power frequency voltage signal related to the insulation impedance can be effectively acquired. In other words, the applications of the shielding-type insulation detection structure of the present disclosure are expanded. Moreover, since it is not necessary to use an additional control mechanism to perform the insulation detection, the shielding-type insulation detection structure of the present disclosure is more convenient and cost-effective.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A shielding-type insulation detection structure, comprising:
   an input power source comprising a first terminal and a second terminal;
   a first shielding layer electrically connected with the first terminal of the input power source;
   a second shielding layer comprising a first sub-layer and a second sub-layer, wherein the first sub-layer and the second sub-layer are separated from each other;
   an insulation layer disposed between the first shielding layer and the second shielding layer;
   a first impedance unit electrically connected between the first sub-layer of the second shielding layer and the second terminal of the input power source;
   a second impedance unit electrically connected between the second sub-layer of the second shielding layer and the second terminal of the input power source; and
   a detection circuit electrically connected with the first sub-layer and the second sub-layer, wherein a detection signal related to a voltage difference between the first sub-layer and the second sub-layer is detected by the detection circuit.

2. The shielding-type insulation detection structure according to claim 1, wherein the first terminal of the input power source is away from a ground terminal, and the second terminal of the input power source is close to the ground terminal.

3. The shielding-type insulation detection structure according to claim 1, wherein the first terminal of the input power source is close to a ground terminal, and the second terminal of the input power source is away from the ground terminal.

4. The shielding-type insulation detection structure according to claim 1, wherein a first portion of the insulation layer between the first shielding layer and the first sub-layer of the second shielding layer is equivalent to a first parallel-connected circuit structure of a first equivalent capacitor and a first equivalent resistor, and a second portion of the insulation layer between the first shielding layer and the second sub-layer of the second shielding layer is equivalent to a second parallel-connected circuit structure of a second equivalent capacitor and a second equivalent resistor, wherein the first parallel-connected circuit structure has a first parallel-connected impedance value, and the second parallel-connected circuit structure has a second parallel-connected impedance value, wherein a ratio of the first parallel-connected impedance value to an impedance value of the first impedance unit and a ratio of the second parallel-connected impedance value to an impedance value of the second impedance unit are equal.

5. The shielding-type insulation detection structure according to claim 1, wherein a first portion of the insulation layer between the first shielding layer and the first sub-layer of the second shielding layer is equivalent to a first parallel-connected circuit structure of a first equivalent capacitor and a first equivalent resistor, and a second portion of the insulation layer between the first shielding layer and the second sub-layer of the second shielding layer is equivalent to a second parallel-connected circuit structure of a second equivalent capacitor and a second equivalent resistor, wherein a frequency f of an AC signal of the input power source, a capacitance value C1 of the first equivalent capacitor, a resistance value RT1 of the first equivalent resistor, a capacitance value C2 of the second equivalent capacitor and a resistance value RT2 of the second equivalent capacitor comply with following formulae:

$$\left| \frac{1}{2\pi f \times C1} \right| \geq RT1,$$

$$\left| \frac{1}{2\pi f \times C2} \right| \geq RT2.$$

6. The shielding-type insulation detection structure according to claim 5, wherein the frequency f of the AC signal of the input power source, the capacitance value C1 of the first equivalent capacitor, the resistance value RT1 of the first equivalent resistor, the capacitance value C2 of the second equivalent capacitor and the resistance value RT2 of the second equivalent capacitor comply with following formulae:

$$\left|\frac{1}{2\pi f \times C1}\right| \gg RT1,$$

$$\left|\frac{1}{2\pi f \times C2}\right| \gg RT2.$$

7. The shielding-type insulation detection structure according to claim 1, wherein the shielding-type insulation detection structure further comprises an isolation impedance disposed between the first sub-layer and the second sub-layer.

8. The shielding-type insulation detection structure according to claim 7, wherein the first sub-layer and the second sub-layer are continuous through the isolation impedance.

9. The shielding-type insulation detection structure according to claim 7, wherein the isolation impedance is formed between the first sub-layer and the second sub-layer through a coating process, a sticking process, a spraying process, an electroplating process or an etching process.

10. The shielding-type insulation detection structure according to claim 7, wherein the isolation impedance is an insulator, a high-resistance value element, a semi-conductor or a low-resistance value element.

11. The shielding-type insulation detection structure according to claim 7, wherein a portion of the first sub-layer is sheltered by a portion of the second sub-layer, so that the portion of the first sub-layer and the portion of the second sub-layer are overlapped, wherein at least a portion of the isolation impedance is disposed between the portion of the first sub-layer and the portion of the second sub-layer.

12. The shielding-type insulation detection structure according to claim 1, wherein a first equivalent capacitor is defined by the first shielding layer and the first sub-layer of the second shielding layer, and a second equivalent capacitor is defined by the first shielding layer and the second sub-layer of the second shielding layer, wherein a capacitance value of the first equivalent capacitor and a capacitance value of the second equivalent capacitor are equal.

13. The shielding-type insulation detection structure according to claim 1, wherein a surface area of the first sub-layer and a surface area of the second sub-layer are equal.

14. The shielding-type insulation detection structure according to claim 1, wherein the second shielding layer further comprises 2N additional sub-layers, and the shielding-type insulation detection structure further comprises additional 2N impedance units corresponding to the 2N additional sub-layers, wherein the first sub-layer, the second sub-layer and the 2N additional sub-layers are discretely arranged, each of the 2N additional impedance units is electrically connected between the corresponding one of the 2N additional sub-layers and the second terminal of the input power source, and N is a positive integer.

15. The shielding-type insulation detection structure according to claim 1, wherein a power signal from the input power source is a DC voltage, a power frequency AC voltage on a grid side, or an AC voltage at a node of a converter.

16. The shielding-type insulation detection structure according to claim 1, wherein each of the first impedance unit and the second impedance unit is a resistor, a serially-connected structure of a resistor and an inductor, a parallel-connected structure of a resistor and an inductor, a serially-connected structure of a resistor and a capacitor or a parallel-connected structure of a resistor and a capacitor.

* * * * *